(12) United States Patent
Geuß et al.

(10) Patent No.: US 10,336,213 B2
(45) Date of Patent: Jul. 2, 2019

(54) METHOD FOR OPERATING AN ELECTRICALLY OPERATED OR ALSO ELECTRICALLY OPERABLE MOTOR VEHICLE AND MOTOR VEHICLE

(71) Applicant: AUDI AG, Ingolstadt (DE)

(72) Inventors: Matthias Geuß, Breitengüßbach (DE); Kai Volkmar, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/640,704

(22) Filed: Jul. 3, 2017

(65) Prior Publication Data

US 2018/0001788 A1 Jan. 4, 2018

(30) Foreign Application Priority Data

Jul. 4, 2016 (DE) .................. 10 2016 212 071

(51) Int. Cl.
*B60L 15/20* (2006.01)
*B60L 53/00* (2019.01)
(Continued)

(52) U.S. Cl.
CPC ............. *B60L 15/2045* (2013.01); *B60L 7/10* (2013.01); *B60L 7/18* (2013.01); *B60L 15/2009* (2013.01); *B60L 53/00* (2019.02); *B60L 53/60* (2019.02); *B60L 58/13* (2019.02); *B60W 10/08* (2013.01); *B60W 10/26* (2013.01);
(Continued)

(58) Field of Classification Search
CPC .... B60L 15/2045; B60L 15/2009; B60L 7/10; B60L 7/18; B60L 11/1809; B60L 11/1838; B60L 11/1862; B60W 10/08; B60W 10/26; G01C 21/3469
See application file for complete search history.

(56) References Cited

U.S. PATENT DOCUMENTS 6,338,391 B1 * 1/2002 Severinsky ............ B60K 6/442
180/65.23
9,937,819 B2 * 4/2018 Healy .................. B60L 15/2045
(Continued)

FOREIGN PATENT DOCUMENTS

DE  102 26 143 A1  1/2004
DE  10 2009 016 869 A1  10/2010
(Continued)

OTHER PUBLICATIONS

European Search Report dated Nov. 24, 2017, in connection with corresponding EP Application No. 17177331.0 (8 pgs.).
(Continued)

*Primary Examiner* — Behrang Badii
*Assistant Examiner* — Daniel L Greene
(74) *Attorney, Agent, or Firm* — Maier & Maier, PLLC (57) ABSTRACT

A method for operating an electrically operated or also electrically operable motor vehicle provided with a rechargeable electric energy storage device associated with the drive motor of the motor vehicle. A target charging state is determined for the energy storage device and an operating strategy is determined for a route that is calculated, entered or predicted for the next trip, by which recuperative deceleration is enabled with a specifiable minimum amount for deceleration processes occurring along the route.

8 Claims, 6 Drawing Sheets

(51) Int. Cl.
*B60L 58/13* (2019.01)
*B60L 7/10* (2006.01)
*B60L 7/18* (2006.01)
*B60W 10/08* (2006.01)
*B60W 10/26* (2006.01)
*G01C 21/34* (2006.01)
*B60L 53/60* (2019.01)

(52) U.S. Cl.
CPC ...... *G01C 21/3469* (2013.01); *B60L 2200/28* (2013.01); *B60L 2240/16* (2013.01); *B60L 2240/26* (2013.01); *B60L 2240/42* (2013.01); *B60L 2240/54* (2013.01); *B60L 2240/645* (2013.01); *B60L 2240/66* (2013.01); *B60L 2240/662* (2013.01); *B60L 2240/68* (2013.01); *B60L 2250/12* (2013.01); *B60L 2250/18* (2013.01); *B60L 2260/52* (2013.01); *B60L 2260/54* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/72* (2013.01); *Y02T 10/7283* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/163* (2013.01)

(56) References Cited

U.S. PATENT DOCUMENTS

| | | | |
|---|---|---|---|
| 2001/0039230 A1* | 11/2001 | Severinsky | B60H 1/004 477/3 |
| 2007/0107949 A1* | 5/2007 | Bradley | B60K 16/00 180/2.2 |
| 2008/0169144 A1* | 7/2008 | DeGrave | B60L 7/08 180/165 |
| 2009/0090573 A1* | 4/2009 | Boone | B60K 6/24 180/65.245 |
| 2013/0030630 A1 | 1/2013 | Luke et al. | |
| 2013/0101502 A1* | 4/2013 | McAlister | B60T 1/00 423/648.1 |
| 2013/0127393 A1* | 5/2013 | Garcia | F03D 3/002 320/101 |
| 2014/0025245 A1* | 1/2014 | Fanourakis | B60W 20/15 701/22 |
| 2014/0195116 A1* | 7/2014 | Hrovat | B60W 10/06 701/38 |
| 2015/0217778 A1* | 8/2015 | Fairgrieve | B60W 50/082 701/37 |
| 2015/0283919 A1 | 10/2015 | Baek et al. | |
| 2015/0294049 A1* | 10/2015 | Kang | B60T 13/665 703/2 |
| 2015/0375751 A1* | 12/2015 | Bjorkman | B60W 40/09 701/22 |
| 2016/0311423 A1* | 10/2016 | Storm | G06Q 50/30 |
| 2018/0012091 A1* | 1/2018 | Ricci | B60L 11/1822 |
| 2018/0086227 A1* | 3/2018 | Healy | B60L 58/10 |

FOREIGN PATENT DOCUMENTS

| | | | | |
|---|---|---|---|---|
| DE | 10 2009 052 853 A1 | 5/2011 | | |
| DE | 102009052853 A1 | 5/2011 | | |
| DE | 10 2012 209 645 A1 | 12/2013 | | |
| DE | 102012209645 A1 | 12/2013 | | |
| DE | 102012212547 A1 | 5/2014 | | |
| DE | 102013217710 A1 | 5/2014 | | |
| DE | 10 2012 023 632 A1 | 6/2014 | | |
| DE | 10 2013 204 913 A1 | 9/2014 | | |
| DE | 10 2013 010 129 A1 | 12/2014 | | |
| DE | 10 2014 008 380 A1 | 12/2014 | | |
| DE | 10 2014 219 658 A1 | 4/2015 | | |
| DE | 102014219658 A1 | 4/2015 | | |
| DE | 10 2014 221 328 A1 | 5/2015 | | |
| DE | 102014221328 A1 * | 5/2015 | ......... G01C 21/3469 | |
| GB | 2515582 A | 12/2014 | | |

OTHER PUBLICATIONS

German Office Action dated Jun. 26, 2017 of corresponding application No. DE 102016212071.9; 14 pgs.
German Office Action dated Nov. 9, 2017, in connection with corresponding DE Application No. 10 2016 212 071.9 (12 pgs.).

* cited by examiner

METHOD FOR OPERATING AN ELECTRICALLY OPERATED OR ALSO ELECTRICALLY OPERABLE MOTOR VEHICLE AND MOTOR VEHICLE

FIELD

The present invention relates to a method for operating an electrically operated or also electrically operable motor vehicle.

BACKGROUND

Various methods and systems are known from prior that can be used in order to plan at the start of the trip a time-optimized or an energy-optimized operating strategy for operating an electrically operated or also electrically operable motor vehicle, such for example a purely electrically operated motor vehicle (Battery Operated Vehicle, or BOV), or a hybrid electric motor vehicle (HEV), or a plug-in hybrid electric vehicle (PHEV).

Furthermore, various methods and systems are also known for planning the optimum operating strategy of an electrical operated or also electrically operable motor vehicle before starting a trip.

For example DE 10 2009 052 531 A describes a method for estimating the range of a motor vehicle based on the amount of energy that is available and detectable in a motor vehicle, wherein the driver determines prior to the start of a trip the limit for a maximum permissible driving speed and/or the maximum permissible acceleration and/or the maximum power to be provided with a comfort system available to the driver, so that the road profile surrounding the motor vehicle, in particular the height elevation profile or a road category are detected and a computing device calculates and displays the ranges that are still possible, at least based on the assumed limitations and based on the detected road profile and the available amount of energy.

Also known are methods and systems relating to the planning of the optimal operating strategy of an electrically operated or also electrically operable motor vehicle prior to the start of a trip, and methods in connection with a prior stationary charging of the electric storage device of this motor vehicle are also known.

For example DE 2012 209 645 A1 describes a method for controlling the charging operation of a battery associated with an electric motor in an electric motor vehicle, wherein a target charging state that is below the maximum charging state of the battery is determined as a function of operation predicting information for an operating segment that is at least partly imminent, so that the charging of the battery is limited to the target charging state.

Also, from DE 10 2014 219 A1 is known a vehicle comprising a battery with a charging state (SOC) value and a maximum SOC target value and at least one control, which is programmed to convert the battery value to a SOC target value that is defined by a difference between a maximum SOC target value and a maximum net SOC increase that is predicted for an expected motor vehicle route, including a regenerative event reducing the charging current supplied to the battery for charging it when the SOC value is smaller than the target SOC value.

SUMMARY

The object of the present invention is to further develop the methods known from prior art and the motor vehicle in such a way so as to achieve advantages that were not achievable with the solutions known from prior art.

The invention proposes a method for operating an electrically operated or also electrically operable motor vehicle (for example a purely electrically operated motor vehicle or battery-operated vehicle (BEV), a hybrid electric vehicle (HEV), or a plug-in-hybrid-electrically operated vehicle (PHEV), with an electric drive motor associated with the vehicle, and a rechargeable electric energy storage device, wherein a route is calculated, entered or predicted for a trip that is anticipated to be the next trip and/or an operating strategy is determined for the motor vehicle by means of a minimum amount of deceleration processes occurring along this route is enabled through recuperative deceleration.

The method according to the present invention comprises at least one of the following steps a) or b):

a) determining a target state for the energy storage device for a stationary charging or discharging operation of the energy storage device taking place immediately before the start of the next trip, while taking into account an input or predicted route that is predetermined to be the route of the next trip, which is different from a predetermined normal value of the total mass of the vehicle, including an optional trailer connected to the motor vehicle and/or air resistance coefficient of the motor vehicle deviating from a predetermined normal value in such a way, that electrical energy obtainable with a predetermined minimum amount from recuperative deceleration along this route during each deceleration process can be absorbed completely or to the fullest extent by the energy storage device, and the charging or discharging of the energy storage device is performed during the stationary charging or discharging process until the target charging state is reached;

b) determining an operating strategy for a route that is calculated, input or predicted as the next route to be traveled, while taking into account the route, the total mass of the vehicle deviating from a predetermined normal value of the motor vehicle, including a trailer optionally connected to the motor vehicle, the air resistance coefficient of the motor vehicle deviating from a predetermined normal value, as well as the charging state of the energy storage device at the beginning of the trip in such a way that recuperative deceleration is enabled with a minimum predetermined amount by means of recuperative deceleration processes occurring along this route, wherein the operating strategy includes at least the following steps:

b1) consumption of electric energy by at least one user of electric energy solely for the purposes of the user of electric energy in anticipation of at least one deceleration phase during the next trip;

b2) anticipatory carrying out of at least one driving phase while taking into account at least one efficiency level worsening measure occurring in the powertrain during the next trip, in particular in the traction motor, so that in comparison to a state without at least one efficiency worsening measure, an increased amount of electric energy is required with at least one driving phase; and/or b3) carrying out during the course of at least one deceleration process during the next trip at least one efficiency level decreasing measure in the powertrain, in particular in the traction motor with respect to its capacity as a generator, so that in comparison to a state without at least on efficiency worsening measure during which at least one deceleration process occurs, a smaller amount of electric energy that can be obtained from recuperative deceleration is created with each minimum amount.

According to the present invention, while taking into account a normal total mass of a vehicle (including a trailer optionally connected to the motor vehicle), a predeterminable minimum amount deviating from a normal total mass of a motor vehicle can be determined by means of deceleration processes occurring along the route, and/or an air resistance coefficient deviating from a normal value can be determined with recuperative processes occurring along the route so that a predeterminable minimum amount is enabled. Optionally, when the target charging state or the operating strategy is determined, it can be also provided that a predeterminable charging state of the rechargeable electric energy storage device is set at the end of each deceleration process.

According to conventional methods and vehicles known from prior art, the actual total mass of the motor vehicle (including optionally also a trailer connected to the motor vehicle) and/or the actual given air resistance coefficient (which is generally expressed as the driving resistance value) of a motor vehicle are not taken into consideration. Instead, only a target state for a charging process of a rechargeable electric energy storage device is determined based on a state of the vehicle that is not specified in more detail and on the basis of the target state for the route to be traveled next.

However, if with an electrically operated or also electrically operable motor vehicle, for example the entire mass will deviate based on the load attached to the roof, and/or on the load of a trailer optionally attached to the motor vehicle, so that it deviates significantly from an assumed "normal value" and the operating strategy that is calculated according to prior art is then no longer optimal and the energy that can be possible obtained free of charge with recuperation is "destroyed". Another disadvantage in such a case is that since sustained deceleration is not available when traveling on a downhill slope with a trailer due to the increased deceleration requirement, namely because the energy storage device is already fully charged already during the descent down the hill, the "excess energy" must be "destroyed" with a friction brake. That is why according to prior art, a larger dimensions of the brake must be used for security reasons than what is required according to the present invention.

If for example a high air resistance coefficient value is obtained than what is assumed based on an assumed "normal value" for a route to be driven during the next trip, for example because bicycles are mounted on the roof of the motor vehicle, without causing a total mass that is significantly different from the "normal value", a smaller amount of recuperative energy will be obtained during a downhill descent than assumed. Since this circumstance is also not taken into account according to the solutions known from prior art, the result is that a small target state will then be assumed, which is disadvantageous with respect to the achievable traveling range (without renewed stationary charging of the rechargeable electric energy storage), so that for example at the end of the deceleration process (such as at the end of the downhill descent), the rechargeable energy storage device will not be fully charged with the energy obtained by means of recuperative deceleration.

The method according to step b) also enables in a novel manner the determination of an optimal strategy for traveling uphill along a calculated, entered or assumed route of the motor vehicle, which can be optionally fully independent of a previous charging or discharging process.

According to a first advantageous further development of the method, in the case of a trailer that is provided with braking capability and connected to the motor vehicle, the breaking force component of the trailer is reduced as follows c1) the braking component of the trailer is increased in favor of a decreased energy level obtained based on the energy that is obtained from the breaking component of the trailer, and/or c2) the braking component of the trailer is decreased in favor of an increased level of energy obtained based on the energy that is obtained from the breaking component of the trailer.

According to the present invention, it can be further advantageously provided that during the procedure according to step b) mentioned above, a stationary charging or discharging operation of the energy storage device takes place in a preliminary procedure immediately before the start of the next trip, while taking into account a calculated, entered or predicted target value determined from the predetermined normal value for the mass of the motor vehicle and/or the value of the normal value of the air resistance coefficient of the vehicle assumed for the target state in such a way, that the electric energy that can be obtained during each deceleration process from each minimum component of the recuperative process taking place along the route while normal value/normal values is or are assumed can be absorbed fully or to the greatest possible extent by the energy storage device, and the energy storage device is charged or discharged during a stationary charging or discharging process until the assumed target charging or discharging status is achieved.

It is also advantageous when during the process according to the invention
    the height profile of the calculated, entered or predicted route is taken into consideration; and
    the location of the vehicle at the start of the next trip is taken into consideration for the determination of the target charging state, of the operating strategy and/or of the assumed target charging state.

Furthermore, the present embodiment also makes it possible to take into account in an advantageous manner for the determination of the target charging state, of the operating strategy and/or of the assumed target charging state the following:
    the road category or the road categories along the calculated, entered or predicted route;
    the given or anticipated weather conditions during the next trip along the calculated, entered or predicted route, in particular including also the given or expected ambient temperature;
    the given or anticipated traffic conditions during the next trip along the calculated, entered or predicted route;
    the characteristics of the vehicle, in particular a predicted conduct of the drivetrain and the lifespan of the drivetrain; and or
    the driving style of the driver and/or driver data.

According to another advantageous embodiment of the method, data can be used for determining the given total mass of the vehicle, including a trailer optionally connected to the motor vehicle and/or the given air resistance coefficient of the vehicle,
    which is detected by means of a sensor system on the side of the motor vehicle, and/or
    by a user of the motor vehicle by means of input carried out at an input device associated with the vehicle.

On the basis of such data, in accordance with the present invention, the given total mass of the motor vehicles, including a trailer optionally connected to the motor vehicle and/or the given air resistance factor of the motor vehicle, can be determined and/or estimated in an advantageous manner
by means of a calculation model.

If there is a deviation during the next trip from the calculated, entered or predicted route, a deviation from the actual energy consumption based on the predicted energy consumption along the route, a change by means of which each respective minimum amount of the recuperative deceleration is determined during each deceleration process enabling to recover electric energy, a change of the given total mass of the motor vehicle, including an optional trailer connected to the vehicle, and/or of the given air resistance coefficient of the motor vehicle, a new calculation of the operating strategy can be carried out in an advantageous manner for the continuation of the trip in such a way that a predeterminable minimum amount that is required for the other sections of the route or the other required deceleration processes required can be obtained by means of a recuperative deceleration.

The present invention also includes an electrically operated or also electrically operable motor vehicle, comprising:
an electric drive motor and a rechargeable electric energy drive device associated with the drive motor,
a control device for the energy storage device, which is adapted to at least determine the charging state of the energy storage device; and
a navigation device, by means of which after the input of the target destination, a route can be calculated and/or with which the current location of the motor vehicle can be determined.

The vehicle according to the present invention is characterized in that it further comprises
a sensor system on the side of the vehicle for detecting data and/or an input device associated with the motor vehicle for input of data by a user of the motor vehicle for determining or estimating the given total mass of the motor vehicle, including an optional trailer connected to the motor vehicle and/or the air resistance coefficient of the motor vehicle, and
a computing device, which is adapted to calculate, input or predict a route for the target state of the energy storage device and/or for the operating strategy of the motor vehicle by means of which recuperative deceleration is possible with respective minimum amounts of deceleration processes along the calculated, entered or anticipated route.

The electrically operated or also electrically operated motor vehicle is adapted according to the present invention in an advantageous manner to enable carrying out the methods according to the present invention, or to enable further developments and embodiments thereof.

BRIEF DESCRIPTION

The present invention will now be described in more detail with reference to the attached figures.

The figures show the following.

The illustrations in the figures are provided purely schematically and not to scale. Identical or functionally identical elements shown in the figures are provided with the same reference numerals.

DETAILED DESCRIPTION

The embodiments described below represent preferred embodiments of the present invention. The present invention is of course not limited to these embodiments.

The features and combinations of features mentioned in the description above, as well as the features and feature combinations mentioned in the following description of embodiment forms, embodiment examples and in the descriptions of figures are indicated not only in the respective combinations, since they can be also used in other combinations, or alone, without departing from the scope of the present invention.

An electrically operated or also electrical operable motor vehicle (for example a battery operated vehicle (BOV), hybrid electric vehicle HEV), or plug-in hybrid electric vehicle (PHEV) is often referred to collectively as an "electrified motor vehicle." or as "electrified motor vehicles".

The steps a) and b) according to the invention can be carried out alternatively or cumulatively. For example, step a) can be carried out first and step b) after that when for example the start of the trip results in a modification of the step a) that is based on the determined route, the total mass and/or the air resistance coefficient.

Figure 1:
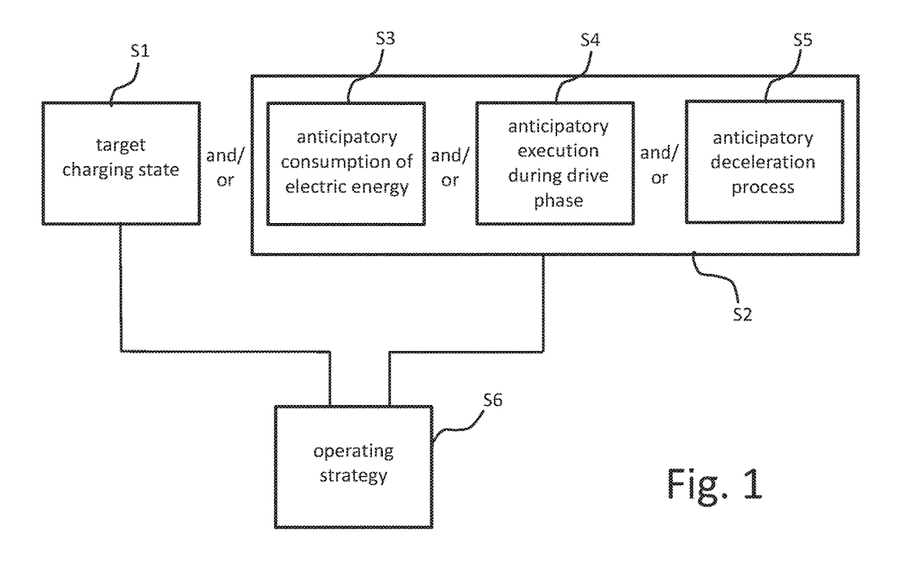
FIG. 1 is a schematic example of a flowchart of a method according to the present invention.

As was already mentioned above, the determination of a target charging state of the energy storage device is performed immediately before the start of the next stationary charging and discharging operation, while taking into account a calculated, entered or predicted route for the next route, as well as the start of the next trip, with a value deviating from the predetermined normal value of the total mass of the motor vehicle, including an optional trailer connected to the motor vehicle and/or deviating from a predetermined normal value of the air resistance coefficient of the motor vehicle in such a way, that a predetermined minimum amount of recuperative deceleration along this route with electric energy that can be generated during each deceleration operation can be absorbed during each deceleration operation fully or to the maximum possible extent, and charging or discharging of the energy storage device is conducted during the stationary charging or discharging operation until the determined target state is achieved (S1).

Since several methods and devices for determining a charging state (SOC=state of charge) are known from prior art, they do not need to be described in more detail in the present application. A person skilled in the art can select one of the known methods and devices to be applied to the present invention without particular limitations.

Electrified motor vehicles are regularly provided with a control unit for the rechargeable energy storage unit that they are equipped with, which is used to determine the given charging state of the rechargeable energy storage device. These charging units can be also configured to control the energy output from the rechargeable energy storage device in a power grid (such as a private power network in private or public storage facilities for electric current, etc.), as is known for example in the field of so called "load balancing".

Therefore, the rechargeable energy storage devices can be charged up to a target charging state not only by means of suitably equipped control units, but also discharged up to the target charging state as long as the electrified motor vehicle is connected to such a power supplying network or to such a storage device.

Since a next trip involves an event in the future, one requirement is that the route to be travelled must be "predicted" in a suitable manner. In a simple case, a user of the motor vehicle may input the route for example with an input device on the side of the motor vehicle (which is generally often described as a "man-machine interface"). Such an input device may include for example a touch-screen and/or a proximity-sensing screen, or just a display screen and at least one input device, for example having the form of a joystick, a rotary push button, or a touchpad (with or without "mouse buttons"), a keyboard, etc. Other/further input possibilities are of course also encompassed by the present invention, such as input by means of voice commands, gestures, etc. This type of an input device can be for example a device that can be used both for operating a navigation device (both for reception and evaluation of signals from navigation satellites) and/or for operating other devices on the side of the driver (for example a multi-media device, an air-conditioning device, etc.).

It is also conceivable that a user of the motor vehicle inputs a destination via a man-machine interface in the navigation device associated with the motor vehicle and a suitable route is then calculate in a per se known manner. If several routes are calculated by the navigation device, it can be provided that the driver can selected one of them. If no such choice can be made according to the present invention for the determination of a target state and/or of an operating strategy of the route, a route is proposed by the navigation device as the "best" route (optionally while taking into account adjusted parameters for the calculation of the route, for example by avoiding highways, toll roads, etc.).

It is further also encompassed by the present invention that a prediction about the next trip is made based for example on a trip that took place in the past. Corresponding methods taking into account the time, the day of the week, the location of the motor vehicle, etc., are known from prior art.

To the extent that the application uses the term a "normal value" with respect to the total mass of the motor vehicle and/or with respect to the air resistance coefficient of the motor vehicle, this "normal value may be defined in any suitable manner. For example, with respect to the total mass of the motor vehicle, a normal value can be based on the empty weight of the motor vehicle plus a predetermined additional weight, which corresponds for example to 50% of the permissible load. It goes without saying that other values can be also selected for the additional weight and other procedures can be also selected in order to determine a "normal value" of the entire mass of the motor vehicle. With respect to the air resistance coefficient, it can be based for example on the air resistance that is indicated for standard equipment.

"Normal values" can be also provided for the consumption of energy along a predetermined length of the route, and for the deceleration process they can be based on the amount of the electric energy that can be obtained from recuperative deceleration, resulting from the "normal values" for the mass of the motor and the air resistance coefficient, stored in a databank on the side of the motor vehicle. These "normal values" can be for example predetermined by that manufacturer of the motor vehicle.

Also, the effects of the measures relating to energy due to a deviation from "normal values" during the operation of an electrified motor vehicle with respect to the mass of the motor vehicle and/or with respect to the air resistance coefficient, (for example relating to the energy requirements for the return trip with a predetermined length of the route and/or relating to the amount of electric energy that can be obtained based on the specifiable minimum amount of recuperative deceleration during the deceleration processes), can be also at least approximately calculated and stored in a databank (table) on the side of the motor vehicle, or by means of suitable algorithms (for instance by using an estimation algorithm) and/or with modeling software.

The present invention is based on the assumption that with deceleration processing occurring along the route to be traveled during the next trip, a specifiable minimum amount can be obtained in each case by means of recuperative deceleration, for example in order to relieve the load on the friction brake and/or to enable smaller dimensions of the friction brake than what would be possible without the present invention.

It is therefore desirable when with each deceleration process, the predetermined minimum amount of electric energy that can be obtained with recuperative deceleration during the route to be traveled can be estimated or calculated as precisely as possible. In addition, it is also desirable when it is possible to know, or to calculate or to estimate the entire energy consumption for a trip along the route with as much precision as possible.

For such an estimation or calculation, at least the following items can be taken into consideration in an advantageous manner the height profile of the route to be calculated, input or predicted, and the location of the vehicle at the beginning of the next trip, for the determination of the state at the destination of the operating strategy and/or of the assumed state at the destination.

It goes without saying that other criteria for the determination of the target state, the items below can be also taken into consideration for the operating strategy and/or for the assumed state at the destination, such as the road category or the categories of the roads along the calculated, entered or predicted route;

the given or expected weather conditions during the next trip along the calculated, entered or predicted route, in particular also the given or expected ambient temperature;

the given or expected traffic conditions during the next trip along the calculated, entered or predicted route;

the characteristics of the motor vehicle, in particular a predicted conduct of the drivetrain and the lifespan of the drivetrain; and/or the driving style of the driver and/or driver data.

It is well known that the speed of an electrified motor vehicle at which the vehicle travels or can travel a on certain section of the route can be an important criterion for the electric energy requirements of an electrified motor vehicle. The speed at which the vehicle enters a downhill descent section (for example a downhill slope) can also have an influence of the requirements for deceleration in a downhill slope section and thus also on the amount of electric energy that can be obtained with recuperative deceleration (which can be sometime also "destroyed"). It is also well known that the permissible highest speed and/or the average speed to be expected with an electrified motor vehicle depend on the category of the road section on which the electrified motor vehicle is traveling (for example a highway, a country road, a city street, a street in a residential area, etc.).

The street categories can be read out, for example from digital maps of a navigation system that is associated with an electrified motor vehicle, or they can be transmitted from an external digital computing system to the electrified motor vehicle (for example by means of a mobile radio network, or with infrastructure-to-vehicle communication).

At the same time, a not insignificant influence on the energy requirement or on the electric energy that can be obtained during the recuperation processes of an electrifiable vehicle can be exerted by the given or expected weather conditions. So for example, a water or snow layer on the roadway can significantly increase the energy requirements per a section of the route or during the entire route when compared to a dry state of the road, or it can considerably reduce the amount of electric energy that can be obtained with recuperative deceleration. The effects of a strong wind on the energy requirements of an electrified motor vehicle are also dependent on the prevailing wind direction relative to the travel direction. With weather conditions that are associated with poor visibility, the headlights and the vehicle lights may need to be switched on during daytime, which may result in a higher energy requirement in comparison to "normal weather".

The ambient temperature can also exert a significant influence on the energy requirements during the trip with an electrified motor vehicle, for example because the comfort facilities in an electrified motor vehicle are operated with a very low or very high temperature, such as the heating or air-conditioning facilities. It may also be necessary or desirable to warm up the battery with a very low ambient temperature. This can result in an additional energy requirement in comparison to an average ambient temperature.

Similarly, the given or anticipated traffic conditions for the next trip or a trip in the future exert a major influence on the energy requirements of an electrified motor vehicle. So for example, an electrified motor vehicle can travel with a higher (average) speed when the streets are free than when there is a lot of traffic, or with traffic jams and/or in construction site areas.

The given or expected weather conditions and the given or expected traffic conditions for the next (forthcoming) trip can be obtained for example from corresponding services, for instance through a network such as the internet, or they can be obtained from a communication device (for example by means of a mobile radio connection, or by means of vehicle-to-infrastructure communication), they can be actively transmitted by a similar service (such as a push service) to a communication device on the side of the motor vehicle.

With regard to the characteristics of the motor vehicle that can be taken into account according to the present invention, those relating to the predicted conduct of the drivetrain and to the lifespan of the drivetrain are mentioned in particular. So for example the recuperation capabilities of the motor vehicle may be reduced based on the expected temperature of the traction motor and/or of the rechargeable electric energy storage device. Changes may be also the result based on the lifespan of drivetrain, in particular based on the length of the routes that have been traveled already, in comparison to a brand new drivetrain, which can be advantageously taken into account for the method according to the present invention.

As further examples of criteria that may be taken into accounted according to the present invention should be mentioned here the energy requirement of the comfort systems (such as for example radio, air-conditioning equipment, heating), the energy requirements of the assistance and security systems, the maintenance state of the electrified motor vehicle, permanent additions/conversions of an electrified motor vehicle (for example spoilers with modified cw values, a modification of the form of the chassis, lowering of the chassis, etc.).

This list is not intended to be an exhaustive list and it is understood that other motor vehicle characteristics, in particular those that have or may have an influence on the energy consumption of an electrified motor vehicle may be also taken into account. The data of the corresponding vehicle characteristics, in particular data that are valid in the long time, can be stored in a storage device of a computing device that is permanently associated with the electrified motor vehicle, or in a component part thereof. It can be also provided that this data can be optionally modified by a driver or by a service device.

It is also know from prior art that it is per se possible to take into account the driving style of the driver. A driving style can be either entered into an input device associated with the electrified motor vehicle (for example that of a defensive driver, a driver emphasizing comfort, a normal driver, a sport driver, a driver emphasizing sport driving), although the driving style of a driver can be also determined based on the driving conduct of the driver during the previous trips in a manner per se known, as well as recognized by the driver when appropriate. The entered or determined driving style has an influence on the energy requirements of an electrified motor vehicle per a route section or per a trip, and optionally also based on predetermined minimum components of recuperative deceleration for an electric energy amount that may be recovered with recuperative deceleration, or based on a falling amount of electric energy (a "more cautious" driver is generally more likely to brake during a downhill descent than a "sport" driver), which can be also taken into account in an advantageous manner according to the present invention.

Furthermore, the present invention may also include the provision that a user of the electrified motor vehicle can input whether he would like to limit the speed and/or the acceleration during the next trip in favor of an increased range, which is to say to drive with a range-optimized driving style.

In addition or as an alternative to a driving style, driver data can be also taken into account according to the present invention. Different drivers can display in addition to a different driving style also a different driving conduct, so that it may be known for example about a first driver that he likes to drive on mountain road segments, while it may be known about a second driver that he avoid mountain road segments as much as possible. In another example is mentioned a driver who avoids unlit streets as much as possible during the dark. This kind of information can be taken into account for example for the calculation or prediction of the next operating sections of the route to be traveled. Based on different resulting routes, different target states, operating strategies and/or assumed target charging states can be also obtained.

Each "minimum amount of recuperative deceleration" can be predetermined in a suitable manner for the recuperative processes, for example while taking into account the performance of the friction brake available in the vehicle, while taking into account also the desired dimensions of the friction brake and/or the capacity of the rechargeable electric energy storage device. So for example, a minimum amount of deceleration processes may occur during a trip along a route so that this amount is specified as 10%, 20%, 30%, 40%, 50%, 60%, 70%, 80%, 90%, but also as 100%.

The respective minimum amounts do not have to be constant and the amounts may also vary along the route during the course of the trip in different route section, in particular they can be different in different hill descent sections. For example, the minimum amount may depend on the state of the friction brake (for example based on its temperature), the length of the mountain descent, the amount of the total required deceleration (for example while taking into account the possible deceleration resulting from the drivetrain and the deceleration resulting from the friction brake), environmental conditions (for instance the ambient temperature), etc. It can be also provided that a minimum amount of the percentage of recuperative deceleration is predetermined with the braking processes on flat or ascending route segments or for only short hill descents.

The method according to the invention assumes that there is a total mass of the motor vehicle, including optionally also a trailer connected to the motor vehicle and/or a given air resistance coefficient of the motor vehicle, which are assumed for the vehicle during the next trip on the route to be traveled next.

The data for determining the given total mass of the motor vehicle, including optionally also a trailer connected to the motor vehicle and/or a given air resistance coefficient of the motor vehicle, may be input for example:
- by means of a sensor system on the side of the driver, and/or
- by a user of the motor vehicle, so that they are input into an input device associated with the vehicle (man-machine interface).

This data can contain the given total mass of the motor vehicle, including optionally also a trailer connected to the motor vehicle and/or a given air resistance coefficient of the motor vehicle. However, as these kinds of values are often not known, they can be determined and/or estimated from the detected and/or input data of the given total mass of the motor vehicle, including optionally also a trailer connected to the motor vehicle and/or a given air resistance coefficient of the motor vehicle, for example by means of a calculation model (for instance by using an estimation algorithm, or a modeling software package).

An object such as a coupled trailer or a bicycle attached to the roof of an electrified motor vehicle can be detected by means of a sensor system on the side of the vehicle. If for example a communication interface is provided between the trailer and the electrified motor vehicle, the permissible total weight of the trailer and/or the type of the trailer (for example trailer provided with a brake or without a brake) can be communicated to a suitably adapted electrified motor vehicle. Bicycles on the roof the electrified motor vehicle can be detected with a camera system and they can be also recognized with image evaluation. A luggage carrier attached on the roof of an electrified motor vehicle can be detected for example with a sensor device that detects the engagement of corresponding counter-elements on the roof or on the railing of the roof of an electrified motor vehicle. Similarly, it can be determined with a suitable sensor system which and whether seats/benches are present in an electrified motor vehicle or not. Also, the loaded state of an electrified motor vehicle can be determined for example with a corresponding sensor system deployed on the shock absorbers of an electrified motor vehicle. The data relating to seat occupancy can also be used for the present invention.

As was already mentioned above, the effects on energy resulting from the operation of an electrified motor vehicle that are based on a deviation from a "normal value" relating to the mass of the motor vehicle and data relating to the coefficient of air resistance (for example with respect to the energy requirement for covering a predetermined length of a route and/or relating to the amount of electric energy that can be obtained based on specifiable minimum amount from recuperative deceleration during deceleration processes) are stored in a databank (table) on the side of the vehicle, or at least calculated by means of a suitable algorithm (for example by using an estimation algorithm) and/or are at least approximately calculated with modeling software. The data that was detected during previous trips as deviating from "normal values" can be also determined and stored for example in a storage device provided for this purpose on the side of the motor vehicle which is also used for the present invention.

For example, a trailer without brakes requires a higher braking force of the electrified motor vehicle in comparison to a trailer that is provided with brakes during the deceleration processes, for instance during a downhill descent. As a result, the energy that is obtained from recuperative deceleration, or the energy of both vehicles "to be destroyed" is increased in comparison to the case of a solo vehicle.

Additionally or alternatively to the detection of data relevant to the present invention by means of a sensor system, corresponding data can be also input by a user of the electrified motor vehicle through an input device associated with the electrified motor vehicle (generally referred to as man-machine interface). Such an input device can comprise for example a touch-sensitive and/or a proximity-sensitive screen, or only a display screen and at least one actuating device, for example in the form of a joystick, a rotary push button, a touchpad (with or without mouse buttons), a keyboard, etc. Other/further input possibilities are of course also encompassed by the present invention, such as input by means of voice commands, gestures, etc.

Permanent parameters or parameters that are input or valid for a long period of time, such as for example the characteristics of the motor vehicle which are or can be optionally taken into account for the present invention can be also stored in a long-term storage device associated with the electrified motor vehicle, wherein matching parameters/modification of the parameters can be provided by the user of the motor vehicle or by a service center.

A previous discharging process is not required for the rechargeable electric energy storage device in the step b) although it may be provided in a preliminary process. Such an optional charging and/or discharging process can be carried out for example according to step a).

Figure 3:
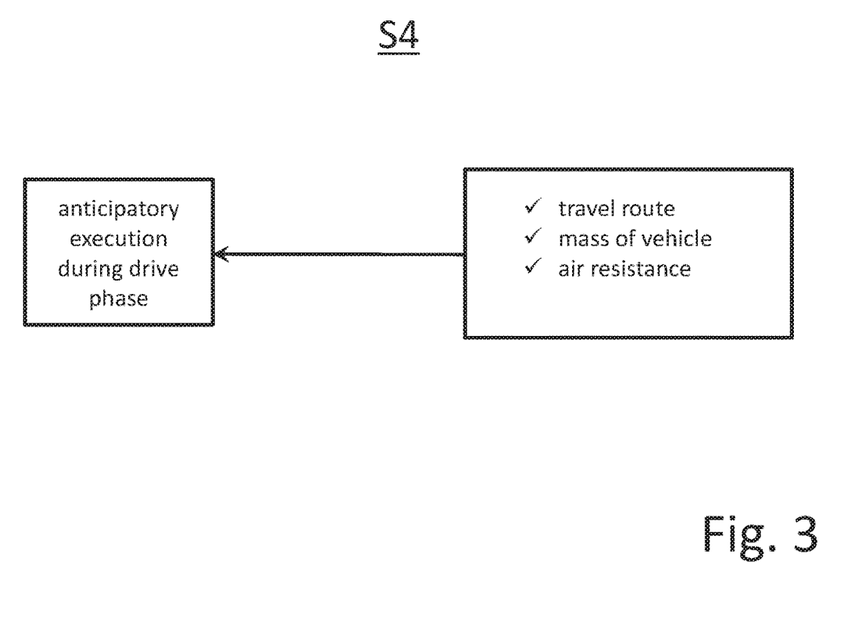
FIG. 3 is a schematic example of the anticipatory execution during the drive phase.
Figure 4:
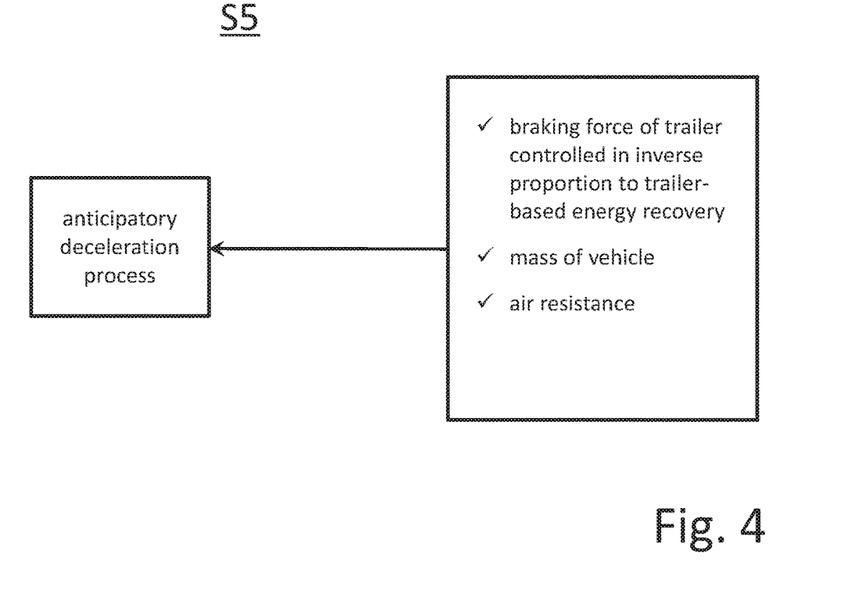
FIG. 4 is a schematic example of the anticipatory deceleration process.
Figure 5:
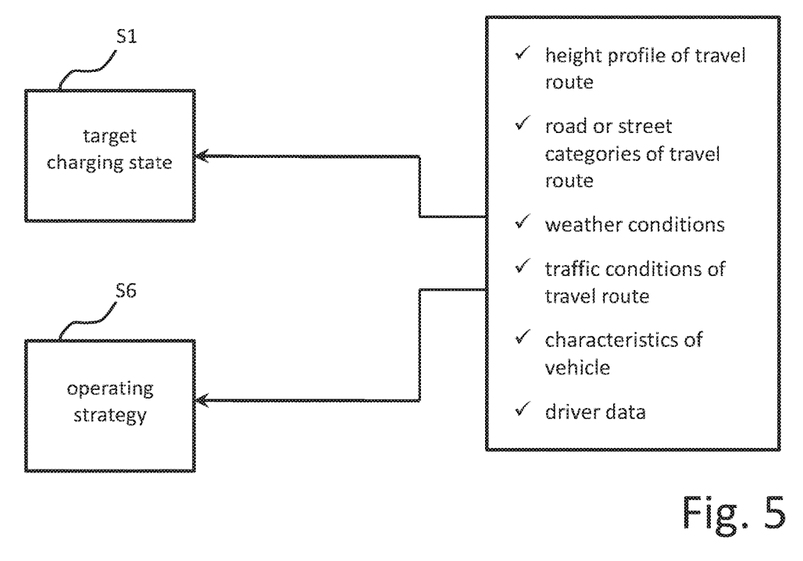
FIG. 5 is a schematic example of the target charging state and the operating strategy.
Figure 6:
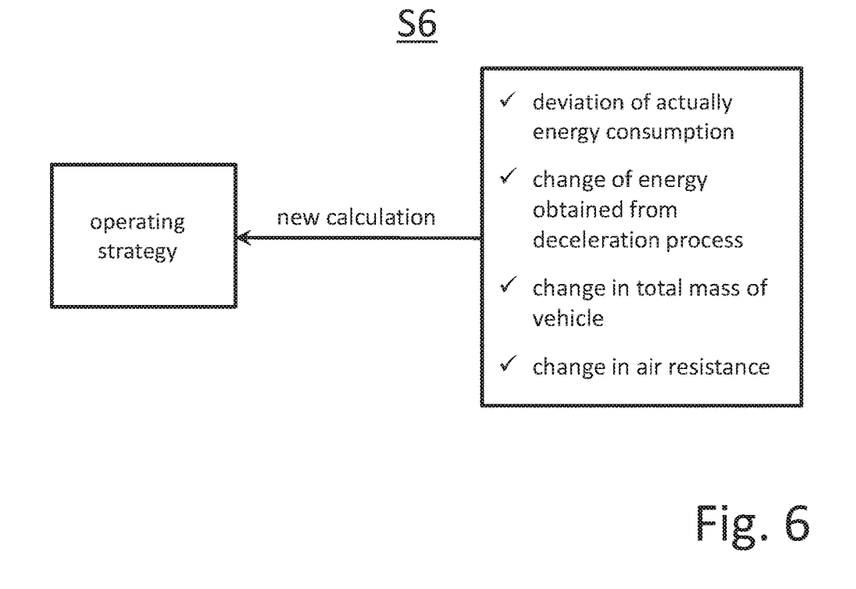
FIG. 6 is a schematic example of new calculations of the operating strategy for deviations.

As was already mentioned above, step b) includes a determination of an operating strategy (S2) for a calculated, entered or predicted route of the next route to be traveled, while taking into account the route that is determined at the start of this route with a total mass that is deviating from a predetermined normal value of the vehicle, including a trailer that is optionally connected to the motor vehicle and/or the air resistance coefficient of the motor vehicle that is deviating from a predetermined normal value of the air resistance coefficient of the motor vehicle, as well as the charged state of the energy storage device at the start of the trip in such a way, that with each deceleration process occurring along this route, a minimum specifiable amount obtained by means of recuperative deceleration is enabled, wherein the operating strategy includes at least one of the following steps:

b1) consumption of electric energy by at least one electric consumer solely for the purposes of anticipatory consumption of electric energy during at least one deceleration phase during the next trip (S3):

b2) anticipatory execution during at least one drive phase during the next trip of at least one efficiency level worsening measure in the drivetrain, in particular in the traction motor, so that in comparison to a state without at least one efficiency level worsening measure, an increased level of electric energy is required during at least a driving phase (S4); and/or b3) carrying out during at least one deceleration process during the next trip at least one efficiency level worsening measure in the drivetrain, in particular with a traction motor in its function of a generator, so that in comparison to a state without the at least one efficiency level worsening measure, a smaller amount of electric energy is created with the minimum amount of recuperative deceleration with at least one deceleration process.

The steps S3 and S4 and/or S5 are selected in such a way that a specifiable minimum is enabled for the deceleration processes occurring along the next (calculated, entered or predicted) route by means of a recuperative deceleration, and optionally, a specifiable charge state of the rechargeable electric storage device is obtained at the end of each deceleration process.

In order to allow such a minimum amount deceleration by means of recuperative deceleration, it is necessary to ensure that the energy obtained with recuperative deceleration can be absorbed by the rechargeable electric energy storage and that the energy obtained with recuperative deceleration can be consumed in another way and/or reduced. Therefore, suitable process steps are provided for this purpose in accordance with steps b1) through b3) (S3 to S5).

For example, according to step b1) (S3), it is provided that in anticipation of or during at least one deceleration phase of the motor vehicle during the trip, electric energy is used by at least one electric consumer only for the purpose of consuming electric energy.

The term "electric consumer" may mean an electric consumer that is not intended for the "normal operation" of the electrified motor vehicle, for example a (high-voltage) resistance heater, which is provided exclusively in order to convert "excessive" electric energy into heat energy, wherein this heat energy is used not to heat the interior of the motor vehicle or other components of the motor vehicle, but possibly emitted as completely as possible into the environment surrounding the motor vehicle.

The term "electric consumer", however, can also mean a consumer that is used in the context of a "normal" operation, for example a heating device for the interior of the motor vehicle, an air-conditioning system, a headlamp device, etc. In order to ensure the comfort of the driver and other occupants of the vehicle with the heating system in the interior of the electrified motor vehicle, the energy should preferably not be "destroyed" at high altitudes, but instead provided for anticipatory use at low altitudes over a long period of time. An optimized use of the resulting power is therefore advantageous, for example for the air-conditioning of the interior of the motor vehicle or of the components of the drive system.

According to step b2) (S4), at least one other efficiency worsening measure can be carried out to achieve the objectives in accordance with the invention in an anticipatory manner at least with respect to the drive phase (drive process) of the drivetrain, in particular when at least one measure worsening the efficiency level of the drivetrain of the traction motor is carried out so that in comparison to a state without at least one efficiency level decreasing measure, an increased amount of electric energy is required during at least one drive phase. Such an efficiency level worsening measure can be for example generating an eddy current and/or operating the traction motor at a rotational speed deviating from an optimal efficiency level (for example at a very low or very high rotational speed), which is made possible when a correspondingly configured manual transmission is provided.

And as a third measure, which can be used as an alternative or additionally to both of the measures mentioned above, according to step b3) (S5), during at least one deceleration process during the next trip which is applied to the drivetrain, in particular to the traction motor, namely to its capacity to function as a generator, at least one efficiency level worsening measure is carried out (wherein these efficiency worsening measures may correspond to the measure (s) mentioned above, so that in comparison to a state without at least one efficiency level worsening measure, energy can be created in at least one deceleration process with respective minimum amounts by recuperative deceleration.

With respect to the measures mentioned above in accordance with the steps b1) through b3 according to the present invention, an attempt is made to ensure that that a measure or a combination of two or three measures relating to the point in time, the duration or the height are selected in such a way that a minimum amount of recuperative deceleration will be enabled with deceleration processes occurring along the route and—optionally—that a specifiable charging state of the rechargeable electric energy storage device is obtained at the end of each deceleration process.

In this case, possible measures can be taken into account according to the steps b1) through b3) with a different priority. For example, the consumption of electric energy by the heating system that is used to heat the interior of the motor vehicle (according to step b1)) cannot be raised without impairing the comfort of the occupant. Based on this background, it can be provided that a measure according to step b2) and/or b3) can be provided as a measure that has precedence, and only if this is not sufficient based on the calculation or estimation of the target charging state/or the operating strategy, a measure according to step b1) is additionally taken, so that in this case, the heating system is turned on as soon as possible and it is operated only with the smallest possible output.

The optionally provided "specifiable charging state" at the end of each deceleration process is preferably 100%, which is to say that at the end of each deceleration process, the rechargeable electric energy storage device is preferably fully charged. However, a state deviating from the "specifiable charging state" may be also present or at least it may be required as a function of at least one deceleration process—for example depending on the course or progress of the route.

In addition to step a) or b), it can be also provided according to the present invention that in the case of a trailer that is provided with a brake and connected to the motor vehicle, a higher amount of electric energy will be obtained from recuperative deceleration of the vehicle during the next trip, so that c1) the breaking force component of the trailer is increased in favor or a lower trailer-based energy recovery amount and/or c2) the breaking force component of the trailer is reduced in favor of a higher trailer-based energy recovery amount.

The option c2) mentioned above can be used for example when it is determined that during the travel along the next route, a smaller amount of electric energy will be obtained by means of recuperative deceleration than predicted and/or a higher energy consumption will be required than predicted without deceleration in the street sections. This option therefore makes it possible so that despite a situation that deviates from the prediction, an advantageous charging state of the rechargeable electric energy storage device is obtained or at least approximately obtained at the end of a deceleration process.

For a person skilled in the art, it is obvious that the option of influencing the braking force component of a trailer in the present field includes providing a corresponding ability to control the braking device of a trailer, a corresponding control of an electrified motor vehicle and a communication interface between the electrified motor vehicle and the trailer.

When the method according to the invention is carried out according to step b), a preliminary procedure can be carried out—as mentioned above—for a stationary charging or discharging operation of the rechargeable electric energy storage device which takes place just prior to the start of the next trip, while taking into account a normal value calculated, entered or predicted for the next route to be traveled relating to the mass of the motor vehicle and/or a normal value predetermined for the air resistance of the motor vehicle so that the assumed target charging state is determined in such a way that a normal value/normal values is/are assumed for the trip along the route based on the minimum amount of recuperative deceleration, the energy that can be recovered from one deceleration recuperative operation can be fully or to the greatest extent possible absorbed by the energy storage device, and charging or discharging of the energy storage device is conducted until the intended target state is achieved.

In this manner, even without knowing the actual total bass of the motor vehicle (optionally also including a trailer connected to the motor vehicle) and/or the actual given air resistance coefficient at the beginning of the trip along the next route, it can often be reached after ending the charging or discharging operation for the charging state "half way through", so that the other step/steps according to step b) of the method according to the invention can be more moderate or omitted, as compared to an arbitrary charging state at the beginning of the trip along the next route.

If there is a deviation during the course of the next trip from the calculated, entered or predicted route, a deviation of the actual energy consumption from the predicted consumption of energy along the route is determined, as well as a change in the actual energy consumption deviating from the predicted energy consumption along the route, a change caused by the minimum amount of recuperative deceleration during each deceleration operation for obtaining electric energy, as well as a change of the given total mass of the motor vehicle, including optionally a trailer connected to the motor vehicle and/or the given air resistance coefficient of the motor vehicle is also determined, which can be carried out in an advantageous manner for the remainder of the trip with a new calculation of the operating strategy so that a specifiable minimum amount of recuperative deceleration is enabled with the required deceleration operations for the other sections of the route.

With a deviation from a calculated, entered or predicted route during the next trip, it is natural that there will be uncertainty as to on which other streets or street sections the driver will travel during the further course of the trip. That is why according to the present invention, the operating strategy is recalculated in view of another "likely" route, or in view of routes and route sections which are located in a specifiable radius of the actual location of the electrified motor vehicle. The specifiable radius may be input for example by a driver by means of the input device mentioned above. The "specifiable radius" may be also oriented so that it is based on an average range that can be reached by an electrified motor vehicle with a fully charged rechargeable energy storage device, or it may be based on an average range that can be reached by the electrified motor vehicle on the basis of the currently available energy in the rechargeable energy storage device and the energy that can be obtained.

If several roads are available within a given radius, a further uncertainty will naturally arise, namely on which of the potential roads within the predetermined radius the driver will be in fact travelling on during the continuation of the trip. This can be also taken into account if it is necessary for a new calculation of the operating strategy that incorporates also corresponding surcharges and/or reductions relating to safety.

Before a route is started, the height profiles of the routes and route sections are known in the current radius of the electrified motor vehicle from route data, which are available for example from a navigation system associated with the electrified motor vehicle and accessible in the navigation system.

It may be also necessary to ascertain whether the deviations from a predicted state mentioned above will result in the requirement or desirability of a new calculation of the operation operating strategy, which can be carried out in any suitable time intervals, for example continuously or after specifiable time intervals.

The method according to the invention as well as its preferred further developments and embodiments can be used with a great degree of flexibility, for example in the context of charging or discharging an electrified motor vehicle provided with an associated rechargeable energy storage device, regardless of whether charging or discharging is carried out before a trip, of also during a trip that has already started.

The method according to the present invention as well as its further development and embodiments can obviously also take into account that at the end of a trip undertaken during the next route, the rechargeable energy storage device will be discharged or that it will display another predetermined charging state.

Figure 2:
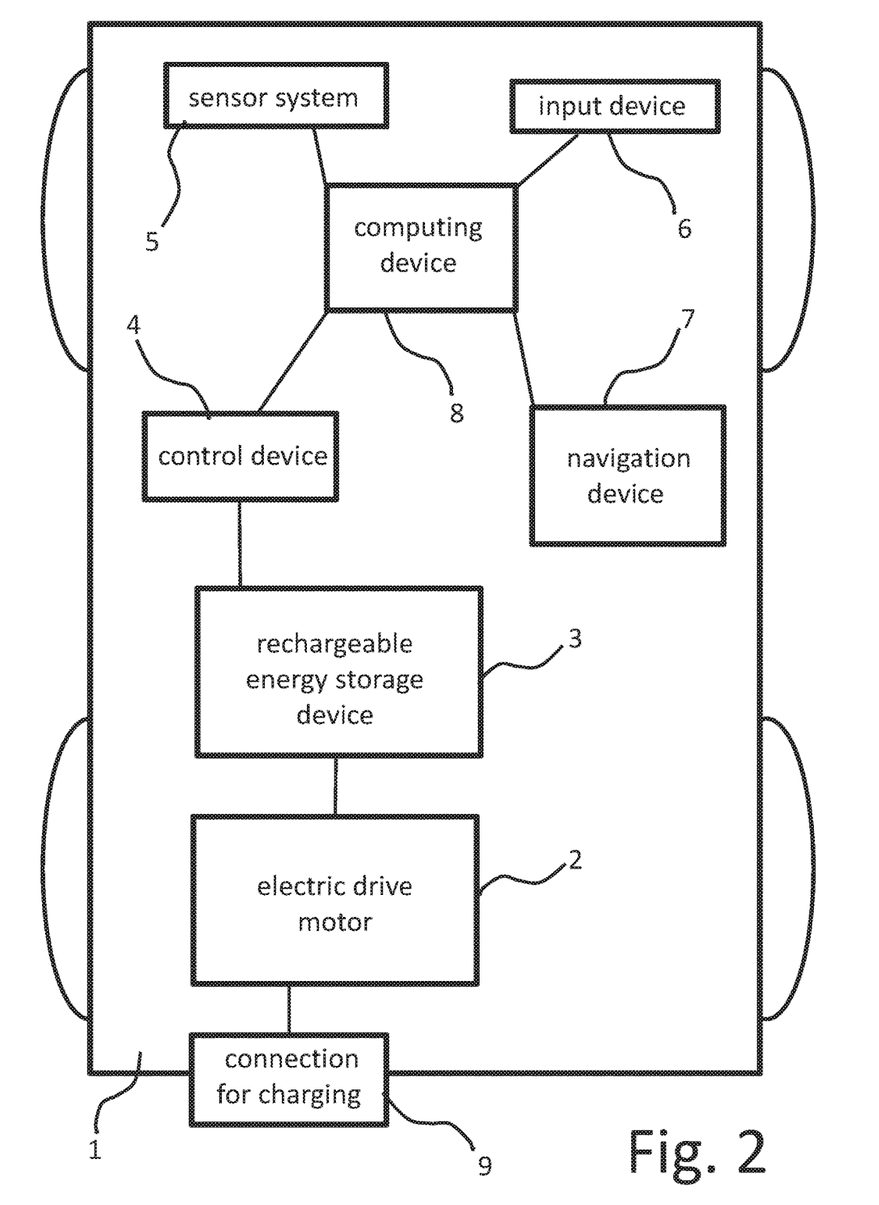
FIG. 2 is a schematic illustration of an example of an electrically operated or also electrically operable motor vehicle according to the present invention.

As shown schematically in FIG. 2, which is not to scale and shown here merely by way of an example, the figure shows an electrically operated but also electrically operable motor vehicle 1 according to the present invention, which is provided with:
- an electric drive motor 2 and a rechargeable energy storage device associated with the drive motor 2,
- a control device 4 for the rechargeable energy storage device 3, which is adapted to determine at least a charging state of the rechargeable energy storage device 3; and
- a navigation device 7, by means of which after the input of the target location, a destination is calculated and/or can be determined.

The motor vehicle 1 according to the present invention is characterized in that it further comprises:
- a vehicle-side sensor system 5 for determining data and/or an input device 6 associated with the vehicle 1 for input of data by a user of the motor vehicle in order to determine or estimate the given total mass of the motor vehicle, including optionally a trailer connected to the motor vehicle and/or the given air resistance coefficient of the motor vehicle, and a computing device (8), which is configured to calculate a target charging state and/or an operating strategy for the motor vehicle for a trip calculated for the next trip, and with an input or predicted route for the charging state of the energy storage device in order to calculate an operating strategy for the motor vehicle, by means of which a minimum amount of recuperative deceleration can be obtained with deceleration processes occurring along the calculated, entered or predicted route.

The electrified motor vehicle 1 according to the present invention can be obviously also provided with other devices, such as at least one friction brake (not shown), a connection 9 to the rechargeable energy storage device 3 with a charging station, a public or private power network, or a public or private storage device for electric current can be of course also provided. As an alternative or s supplement, the electrified mobile vehicle 1 can be adapted for inductive charging and discharging of the rechargeable energy storage device 3. At the same time, other devices can be also provided, such as for example a digital computing device for calculating or estimating a given total mass, or of a given air resistance of the motor vehicle and/or the effects of the "energy measures", or of an internal combustion engine (in case of a non-electrified motor vehicle).

The electrified motor vehicle according to the present invention can further also be advantageously adapted to carry out one of the methods according to the present invention, or one of its preferred further developments. For this purpose, the motor vehicle 1 should be of course equipped with all the required devices, or the motor vehicle 1 should be equipped with all the devices required for this purpose.

The present invention will now be explained in more detail on two examples.

In this case, the following is applicable to the starting situation in both examples: an electrified motor vehicle 1 is located on a hill or an elevation and the rechargeable electric energy storage device can be recharged stationarily. The electric motor vehicle 1 is connected to a trailer before the start of the next upcoming trip.

The next upcoming trip will include a long downhill descent. During the entire downhill descent, a specifiable minimum amount of the deceleration processes occurring in this case must be enabled in order to relieve the load on the friction brake.

Example 1

The trailer is attached to the electrified motor vehicle 1 and detected by a sensor system 5 on the vehicle-side; as an alternative, the driver can "notify" the electrified motor vehicle 1 (for example via the input device 6) that the electrified motor vehicle 1 is connected to a trailer, or will be connected to a trailer before the next upcoming trip. At the same time, the course to be traveled by the electrified motor vehicle 1 during the next trip is known (for example based on the input of the driver with a navigation device 7).

The electrified motor vehicle 1 is connected to a charging station, a power supply network, or a storage device for electric current supply and the rechargeable electric energy storage device 3 is recharged while taking into account the additional mass of the trailer to such an extent or discharged so far (until a calculated or estimated target state is reached) that the electric energy that can be obtained from each deceleration processing with each minimum recuperative deceleration amount along this route is fully absorbed or absorbed to a maximum extent by the energy storage device.

With a sufficient capacity of the rechargeable electric energy storage device (and with a suitable progress on the route) it can be in this case ensured that deceleration processes will be carried out completely along the route by means of recuperative deceleration and the electric energy obtained in this manner will be also fully absorbed by the rechargeable electric energy storage device.

If the capacity of the rechargeable electric energy storage device is not sufficient, one or several measures can be taken by means of electric energy that can be recovered with recuperative deceleration by a rechargeable electric energy storage device according to b1) through b3) (S3 through S5) in order to destroy electric energy, or preferably not to allow it to be created at all. In such a case, it can be further be also possible to carry out the deceleration processes along the route fully by means of recuperative deceleration.

Only when the combination of measures mentioned in the preceding paragraph no longer makes it possible to carry out the deceleration processes along the route fully by means of recuperative deceleration, it becomes necessary to reduce the proportion of several or of all deceleration processes with recuperative deceleration to less than 100% (compared to what up until this point was a minimum amount; wherein the predetermined minimum amount—as mention above—can be determined differently for different deceleration processes), and the remaining part of the required deceleration can be taken over by the friction brake. Even with such a scenario that is not perfect, the load on the friction brakes is always advantageously relieved.

Example 2

In this example, the trailer is not attached before the stationary charging and the driver also does not notify the electrified motor vehicle 1 that it is attached after the charging. In such a case, the rechargeable energy storage device 3 of the electrified vehicle 1 can be charged by simply using only a "normal value" for the total mass of the motor vehicle and/or a "normal value" for the air resistance until an assumed charging state is reached, in particular while taking into account the "normal" energy recuperative recovery conduct of the electrified vehicle 1.

This "assumed charging state" is in this case selected so that in each case, a minimum amount could be obtained by means of recuperation during all of the downhill travel with the deceleration processes required for this purpose.

At the beginning of the trip, the trailer is connected to the electrified motor vehicle 1, which is detected by a sensor system 5. Alternatively or in addition to this, the presence of a trailer that is connected to the motor vehicle can be communicated to the motor vehicle with an input of the user. With the required increase of the braking force during the downhill descent, the rechargeable energy storage device 3 would be fully charged already before the end of the descent with recuperation. Therefore the wording "destroyed" according to the present invention means that the electrified vehicle 1 is enabled with least one of the measures according to the steps b1) through b3) with recuperative deceleration for precisely as much energy as is obtained by means of recuperative deceleration with a minimum amount by the respective deceleration processes occurring along the route.

In addition, in each of the two examples mentioned, an attempt is made to achieve a target specification so that at the end of at least one downhill descent travel (if the route includes only one downhill descent travel, than at the end of this downhill descent travel), the rechargeable energy storage device 3 is fully charged in order to achieve the greatest possible range for continued traveling.

The examples mentioned above are used merely to illustrate the present invention in more detail. The present invention is obviously not limited to these examples. Rather, the present invention is defined by the protective scope defined by the claims below, while the description and the drawings are used for its interpretation.

The devices, apparatuses, component parts, hardware and software components required for the electrified motor vehicle 1 according to the present invention as well as for the further advantageous developments of the electrified motor 1 and their possible and advantageous interactions are known to a person skilled in the art, so that they do not need to be further explained in this application.

The present invention makes it possible to provide an optimal operating strategy for an electrical operated motor vehicle (battery-operated motor vehicle (BOV) or also electrically operated motor vehicle (for example a hybrid electric motor vehicle (HEV), or a plug-in hybrid electric motor vehicle (PHEV), with the maximum energy absorption during the next trip by means of a rechargeable electric energy storage device provided for the vehicle (for example a traction battery (batteries), supercondenser (supercondensers) and while also taking into account that recuperative deceleration is ensured at the required or desired height, if it is required along certain sections of the route, possibly in conjunction with a previous stationary charging or discharging of the rechargeable electric energy storage device.

Therefore, after a previous charging or discharging of the rechargeable energy storage device to a target state, a "recuperative strategy" can be determined for the next trip while maintaining a "minimum recuperation" (for example to support the traction brake), if recuperation by means of the drivetrain is required or desirable during the next trip in one or several locations (for example during a downhill descent).

The present invention makes it possible to achieve in particular smaller dimensions of the traction brake compared to what is possible with electrified vehicles according to prior art, since the supportive deceleration is ensured in each case with a minimum recuperation amount, as long as this is required for certain sections of the route. This also results in advantageous savings with respect to the material and the weight in comparison to previously known prior art.

The invention claimed is:

1. A method for operating an electrically operated or an electrically operable motor vehicle provided with a rechargeable electric energy storage device associated with an electric drive motor, wherein a target state is determined for the energy storage device for a calculated, entered or predicted route for the next trip and an operating strategy is determined for the vehicle, and a minimum specifiable amount of recuperative deceleration is enabled for deceleration processes occurring along this route, comprising:
    a) determining a target state for the energy storage device for stationary charging or discharging state of the energy storage device taking place just prior to the start of the next trip, while taking into account a calculated, entered or predicted route to be traveled as the next route, as well as the total mass of the motor vehicle deviating from a predetermined normal value given at the start of the next journey, including a trailer optionally connected to the motor vehicle and deviating from the normal value of the air resistance coefficient, which deviates from a predetermined normal value in such a way that electric energy can be absorbed with a minimum amount of recuperative deceleration fully or to the greatest possible extent for each of the deceleration processes occurring along this route by the energy storage device, and so that charging or discharging of the energy storage device can be carried out during the stationary charging or discharging until the determined target charging state is reached;
    b) determining an operating strategy for a calculated, entered or predicted route as the route to be traveled during the next trip, while taking into account the route that was determined at the start of the next trip, the total mass of the vehicle deviating from a predetermined normal value, including a trailer optionally connected to the motor vehicle and the air resistance value of the motor vehicle deviating from a predetermined normal value, as well as the charged state of the energy storage device at the start of the trip in such a way that each specifiable minimum amount is enabled by recuperative deceleration for each deceleration process occurring along this route,
    wherein the operating strategy for this purpose comprises at least one of the following steps:
    b1) consuming electric energy by at least one electric consumer solely for the purpose of using electric energy in an anticipatory manner or during at least one deceleration phase during the next trip;
    b2) carrying out in an anticipatory manner at least during one drive phase of the next trip at least one efficiency level worsening measure relating to the drivetrain, in particular to the traction motor, so that in comparison to a state without the at least one efficiency level worsening measure, an increased level of electric energy is required during at least one drive phase; and
    b3) carrying out during at least one deceleration process during the next trip at least one efficiency level worsening measure relating to the drive train, in particular to the traction motor in its capacity as a generator, so that in comparison to a state without the at least one efficiency level worsening measure, a smaller amount of electric energy that can be obtained with recuperative deceleration is created with each minimum amount at least during one deceleration process, and
    wherein in a trailer provided with a brake, which is connected to the motor vehicle, during at least one deceleration phase of the motor vehicle during the next trip:
    c1) the braking force component of the trailer is increased in favor of a lower trailer-based energy recovery; and
    c2) the braking force component of the trailer is decreased in favor of a higher trailer-based energy recovery.

2. The method according to claim 1, wherein in a preliminary procedure for a charging or discharging process taking place just before the beginning of the next trip, while taking into consideration a route that is calculated, entered or predicted as the route to be traveled next, wherein a normal value is determined for the mass of the motor vehicle and a predetermined normal value is determined for the air resistance coefficient in such a manner, that while assuming the normal value/normal values during the drip along the route traveled, the electric energy that can be obtained by each minimum amount of recuperative deceleration obtained with each deceleration process can be fully or to the greatest extent possible absorbed by the energy storage device, and charging or discharging of the energy storage device is conducted during the stationary charging or discharging process until the assumed target state is reached.

3. The method according to claim 2, wherein a height profile of the calculated, entered or predicted route; and the location of the motor vehicle at the beginning of the next trip are taken into consideration for the determination of the target charging state according to step a), for the operating strategy according to step b) and for the assumed target charging state.

4. The method according to claim 3, wherein for the determination of the target charging state according to step a) of the operating strategy according to step b) and of the assumed target charging state the following items are further taken into account:
- the road category or the street categories along the calculated, entered or predicted route;
- the given or expected weather conditions during the next trip along the calculated, entered or predicted route, in particular also the given or expected ambient temperature;
- the given or expected traffic conditions during the next trip along the calculated, entered or predicted route;
- the characteristics of the motor vehicle, in particular a predicted conduct of the drivetrain and the lifespan of the drivetrain, and
- a driving style of the driver and driver data.

5. The method according to claim 4, wherein data for determining the total mass of the motor vehicle, including optionally a trailer connected to the motor vehicle and the given air resistance coefficient of the vehicle are detected by a sensor system on the side of the driver, and entered by a user of the motor vehicle with an input carried out by means of an input device associated with the motor vehicle.

6. The method according to claim 5, wherein the given total mass of the motor vehicle, including a trailer optionally connected to the motor vehicle and the given air resistance of the motor vehicle are determined and estimated by means of a calculation model.

7. The method according to claim 6, wherein in the case when during the course of the next trip, a deviation from the calculated, entered or predicted route is determined, or a deviation of the actually energy consumption from the predicted energy consumption along the route is determined, or a change of the electric energy that can be obtained from each deceleration process with each minimum amount of recuperative deceleration, a change of the given total mass of the motor vehicle, including a trailer optionally connected to the motor vehicle and of the given air resistance coefficient of the motor vehicle is determined for the continuation of the trip, a new calculation of the operating strategy is carried out in such a way that the required deceleration processes are possible with a specifiable minimum amount that can be obtained by recuperative deceleration for further sections of the route or the possible other sections of the route.

8. An electrically operated or also electrically operable motor vehicle, comprising:
- an electric drive motor and a rechargeable electric energy storage device associated with the drive motor,
- a control device for the energy storage device, which is adapted to determine a charging state of the energy storage device; and
- a navigation system, by which a route can be calculated and the actual location of the vehicle can be determined after the input of a target location,
- a sensor system on the side of the motor vehicle for detecting data and with an input device associated with the motor vehicle for input of data by a user of the motor vehicle for determining or estimating the given total mass of the motor vehicle, including a trailer potentially connected to the motor vehicle and/or the given air resistance value of the motor vehicle; and
- a computing device, which is configured to calculate a target charging state and an operating strategy for the motor vehicle for a trip calculated as the next trip, and an input, entered or predicted route for the charging state of the energy storage device in order to calculate an operating strategy for the motor vehicle, by which a minimum amount of recuperative deceleration can be obtained with deceleration processes occurring along the calculated, entered or predicted route, and
- wherein in a trailer provided with a brake, which is connected to the motor vehicle, during at least one deceleration phase of the motor vehicle during the next trip:
- c1) the braking force component of the trailer is increased in favor of a lower trailer-based energy recovery; and
- c2) the braking force component of the trailer is decreased in favor of a higher trailer-based energy recovery.

* * * * *